United States Patent
Deinzer et al.

(10) Patent No.: US 6,838,845 B2
(45) Date of Patent: Jan. 4, 2005

(54) CIRCUIT ARRANGEMENT OF AN ELECTROMOTOR COMPRISING TWO TERMINALS

(75) Inventors: Rudolf Deinzer, Neumarkt (DE); Rainer Jehn, Ingolstadt (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 10/415,782

(22) PCT Filed: Oct. 5, 2001

(86) PCT No.: PCT/EP01/11491

§ 371 (c)(1),
(2), (4) Date: Aug. 26, 2003

(87) PCT Pub. No.: WO02/37662

PCT Pub. Date: May 10, 2002

(65) Prior Publication Data

US 2004/0051488 A1 Mar. 18, 2004

(30) Foreign Application Priority Data

Nov. 3, 2000 (DE) .......................... 100 54 528

(51) Int. Cl.$^7$ ................................. H02P 7/00
(52) U.S. Cl. ................. 318/287; 318/280; 318/286; 318/445; 49/26; 49/28
(58) Field of Search ............... 49/26, 28; 318/280–287, 318/445, 264, 266, 434, 245, 293

(56) References Cited

U.S. PATENT DOCUMENTS

| | | | | | |
|---|---|---|---|---|---|
| 4,833,376 | A | * | 5/1989 | Shimura | 318/286 |
| 4,916,369 | A | * | 4/1990 | Huyer | 318/286 |
| 5,008,603 | A | * | 4/1991 | Nakayama et al. | 318/568.1 |
| 5,229,695 | A | * | 7/1993 | Tsuda et al. | 318/434 |
| 5,552,686 | A | * | 9/1996 | Schmid et al. | 318/362 |
| 5,714,854 | A | * | 2/1998 | Mizuta et al. | 318/266 |
| 6,153,990 | A | * | 11/2000 | Feil et al. | 318/280 |
| 6,252,363 | B1 | * | 6/2001 | Grady | 318/266 |
| 6,281,648 | B1 | * | 8/2001 | Iwata et al. | 318/434 |
| 6,525,499 | B2 | * | 2/2003 | Naganuma | 318/445 |
| 6,690,131 | B1 | * | 2/2004 | Shimomura et al. | 318/445 |
| 2002/0117982 | A1 | * | 8/2002 | Jehn | 318/280 |

FOREIGN PATENT DOCUMENTS

| | | |
|---|---|---|
| DE | 4027767 | 3/1992 |
| DE | 4131984 | * 4/1993 |
| EP | 0978401 | 2/2000 |
| GB | 2344477 | 6/2000 |
| JP | 54156116 | 12/1979 |

* cited by examiner

Primary Examiner—Paul Ip
(74) Attorney, Agent, or Firm—W. F. Fasse; W. G. Fasse

(57) ABSTRACT

An electromotor can be selectively actuated for operation in both rotational directions. In the condition of the electromotor not energized with current, respectively one rotational direction of the electromotor is blocked and one rotational direction remains movable in a free-running manner. The circuit includes first and second diodes forward-connected from ground to first and second motor terminals, a respective change-over switch connecting each motor terminal selectively to power or ground, and a free-run blocking switch interposed preferably between one of the motor terminals and its associated change-over switch.

4 Claims, 2 Drawing Sheets

CIRCUIT ARRANGEMENT OF AN ELECTROMOTOR COMPRISING TWO TERMINALS

FIELD OF THE INVENTION

The invention relates to a circuit arrangement of an electromotor that has two terminals and that can be reversed in its running direction.

BACKGROUND INFORMATION

In modern motor vehicles, a plurality of electromotors are used, which take over actuating or control functions primarily in the area of comfort. In this context, each electromotor is connected with a circuit arrangement, through which the electromotor is switched according to the actuating or control functions required by the vehicle driver or by superordinated control devices. For this purpose, several switches are arranged on the circuit arrangement, which effectuate the forward running, the reverse running as well as the blocking of the electromotor.

The blocking of the resting electromotor is achieved electronically in a simple manner, in that the two terminals of the electromotor are short-circuited. In this regard, in connection with an externally forced rotation of the armature shaft of the electromotor, according to Lenz's law, the generated electrical power acts against or contrary to its causation, whereby the rotation of the armature shaft is maximally damped. This damping is sufficient to prevent the rotation of the armature shaft of the electromotor, for example, if components of low mass that are connected with the armature shaft via gear wheels act on the armature shaft during the acceleration or the deceleration of a motor vehicle.

In this context, the circuit arrangement becomes correspondingly more complex and costly, if the blocking of the resting electromotor is only to be effectuated for one rotational direction of the armature shaft, while the respective other rotational direction of the armature shaft shall remain rotatable without damping.

SUMMARY OF THE INVENTION

It is the underlying object of the invention to provide a circuit arrangement of an electromotor that comprises two terminals, is reversible in its rotational direction, and effectuates the blocking of the armature shaft of the resting electromotor only for one of the two rotational directions. In this context, the circuit arrangement should be simply constructed and economically to be produced.

This object is achieved according to the invention in a circuit arrangement of the electromotor that has the following components or features.

One terminal of the electromotor is connected with a first current branch, and the other terminal of the electromotor is connected with a second current branch.

Both current branches, on the end opposite the electromotor, respectively comprise a change-over switch, through which the first and the second current branch are connected with a current source or with a ground branch for operating the electromotor corresponding to the desired rotational direction.

For blocking the electromotor, a first diode is circuit-connected in the blocking direction between the first current branch and the ground branch, whereby there arises a free running loop or circuit that is effective for one rotational direction of the electromotor.

Moreover, for blocking the electromotor, a second diode is circuit-connected in the blocking direction between the second current branch and the ground branch, whereby there arises a further free running loop or circuit that is effective for the other rotational direction.

Moreover, a switch is needed, which is included in the circuit arrangement depending on which rotational direction is to be blocked and which rotational direction of the electromotor shall remain rotatable without damping:

Either the switch is arranged in the first current branch between the first change-over switch and the connection of the first diode on the first current branch, whereby one rotational direction of the electromotor is blocked, or the switch is arranged in the second current branch between the second change-over switch and the diode of the second current branch, whereby the other rotational direction of the electromotor is blocked.

The first and the second change-over switch as well as the switch can advantageously be formed by relays.

The inventive circuit arrangement of an electromotor comprising two terminals makes it possible to achieve the blocking of exactly one rotational direction of the armature shaft of the resting electromotor, with a simple construction, and in this context can be economically produced.

In the following, the circuit arrangement of an electromotor comprising two terminals, which electromotor drives the toothed gear rack of a belt actuating or positioning device of the safety belt of a passenger vehicle, is illustrated and described in detail in connection with three figures.

BRIEF DESCRIPTION OF THE DRAWINGS

It is shown by.

DETAILED DESCRIPTION OF AN EXAMPLE EMBODIMENT OF THE INVENTION

In two-door passenger vehicles, the vehicle doors are dimensioned so large so that the seat belts or safety belts of the front vehicle seats, which seat belts are integrated in the B-columns for example, can only be reached and pulled in by the driver and the front passenger only with effort. For increasing the comfort, such passenger vehicles can be equipped with belt actuators or positioners, which bring or guide the seat belt into an easily reachable position, for example after the activation of a seat occupancy recognition and the closing of the doors.

For this purpose, a toothed gear rack, which comprises a U-shaped head piece that guides the seat belt, is driven in and out by an electromotor, onto the armature shaft of which a toothed gear wheel is secured. The path distance by which the toothed gear rack is driven out and in by the electromotor is regulated by a control device allocated to the belt positioner, and this control device is connected with sensors for determining the position of the toothed gear rack.

Especially due to interferences of these sensors, it can occur that the toothed gear rack remains in a position that is unknown to the control device. In this context, it is important that the toothed gear rack of the belt positioner can be easily pushed back into its resting position, that is to say can be retracted or driven in, whereby this resting position is again recognized by the control device. Contrary thereto, the toothed gear rack of the belt positioner may not automatically drive out or extend itself in connection with the deceleration of the passenger vehicle. For this purpose, the connections or terminals of the electromotor for this rotational direction of the armature shaft are short-circuited via a free running loop or circuit.

Figure 1:
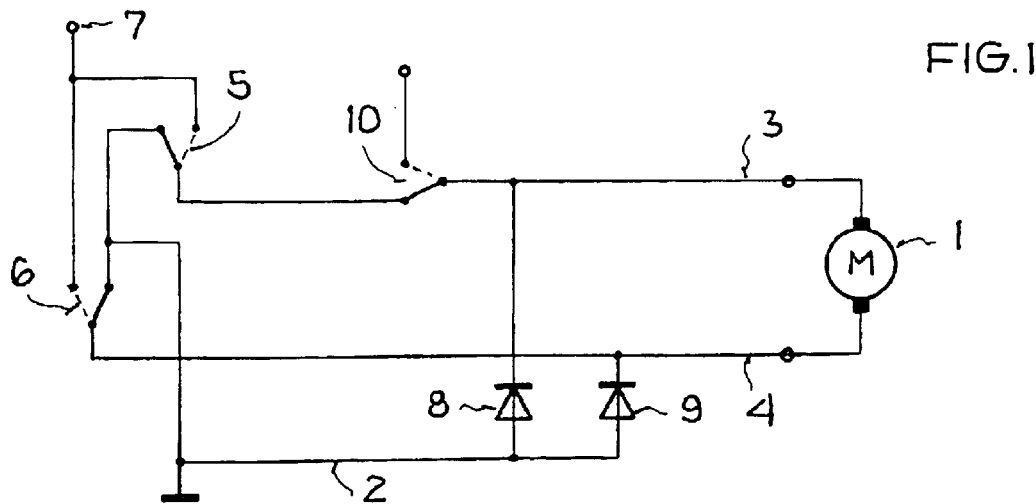
FIG. 1 the circuit diagram of the circuit arrangement of an electromotor comprising two terminals, FIGS. 2a/2b circuit diagrams of the circuit arrangement with the switch in the first current branch for respectively one forced rotational direction of the armature shaft, with illustration of the current flows resulting if applicable, FIGS. 3a/3b circuit diagrams of the circuit arrangement with the switch in the second current branch for respectively one forced rotational direction of the armature shaft, with illustration of the current flows resulting if applicable.

The circuit arrangement of the electromotor comprising two terminals for driving out and in (or extending and retracting) the toothed gear rack of the belt positioner is illustrated in the FIG. 1. The circuit arrangement consists of the electromotor 1 comprising two terminals, which drives the toothed gear rack (not illustrated) of the belt positioner. One terminal of the electromotor 1 is connected with a first current branch 3, while the other terminal of the electromotor 1 is connected with a second current branch 4.

At its end opposite the electromotor 1, the first current branch 3 comprises a first change-over switch 5, while the second current branch 4 correspondingly comprises a second change-over switch 6. By means of the two change-over switches 5, 6, for operating the electromotor 1, the first and the second current branch 3, 4 are switched against a current source 7 or against a ground branch 2 corresponding to the desired rotational direction of the armature shaft. In this context, one of the two change-over switches 5, 6 is always connected with the current source 7, while the respective other one of the two change-over switches 5, 6 is connected with the ground branch 2.

For blocking the electromotor, a first diode 8 is circuit-connected in the blocking direction between the first current branch 3 and the ground branch 2. Moreover, a second diode 9 is circuit-connected in the blocking direction between the second current branch 4 and the ground branch 2. Through the two diodes 8, 9, two free running circuits or loops are formed, which, for a resting electromotor 1 that is not energized by a current, cause a short-circuit of the two terminals of the electromotor 1, so that the armature shaft does not rotate in connection with an incident force acting through the toothed gear rack.

For the possibility that only one of the two rotational directions of the armature shaft is blocked through the free running circuits or loops, a switch 10 is arranged in the first current branch 3 or the second current branch 4 depending on the rotational direction of the resting electromotor 1 that is to be blocked. In this context, the switch 10 is arranged in the first current branch 3 between the change-over switch 5 and the connection of the first diode 8 on the first current branch 3, for blocking the one rotational direction of the armature shaft. Alternatively, the switch 10 can be arranged in the second current branch 4 between the change-over switch 6 and the connection of the second diode 9 on the second current branch 4, for blocking the other rotational direction of the armature shaft.

The various necessary combinations of the positions of the two change-over switches 5, 6 and of the switch 10, which are embodied as relays, are stored in a logic component or chip, which is a part of the circuit arrangement.

With a closed switch 10 and with both change-over switches 5, 6 switched to the ground branch 2, for both rotational directions of the armature shaft of the electromotor 1, there is formed in the circuit arrangement, a conducting connection between the terminals of the electromotor 1 through the first current branch 3, the switch 10, the change-over switch 5, the ground branch 2, the change-over switch 6 and the second current branch 4, so that a forced rotation of the armature shaft is damped for both rotational directions.

Figure 2A:
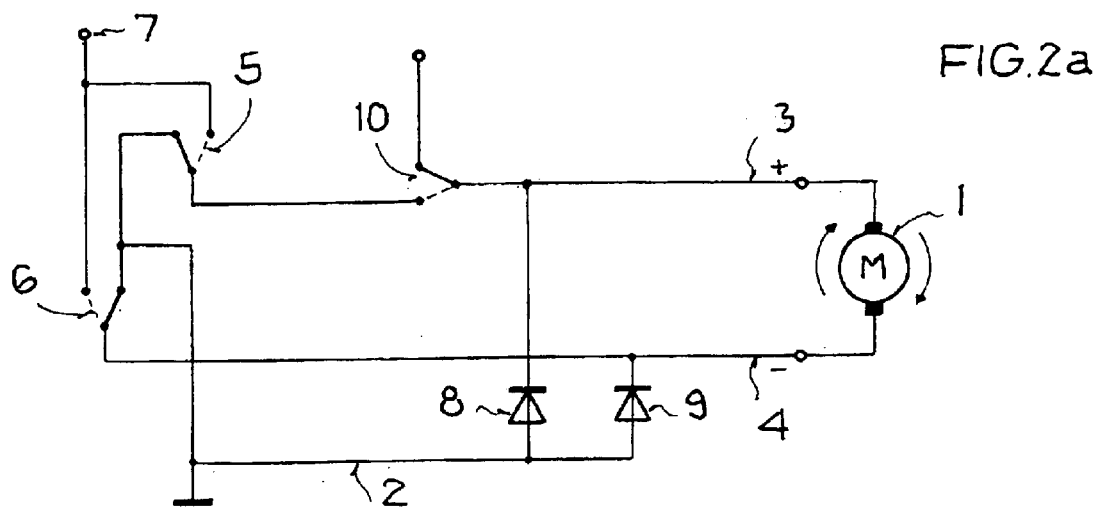
Figure 2B:
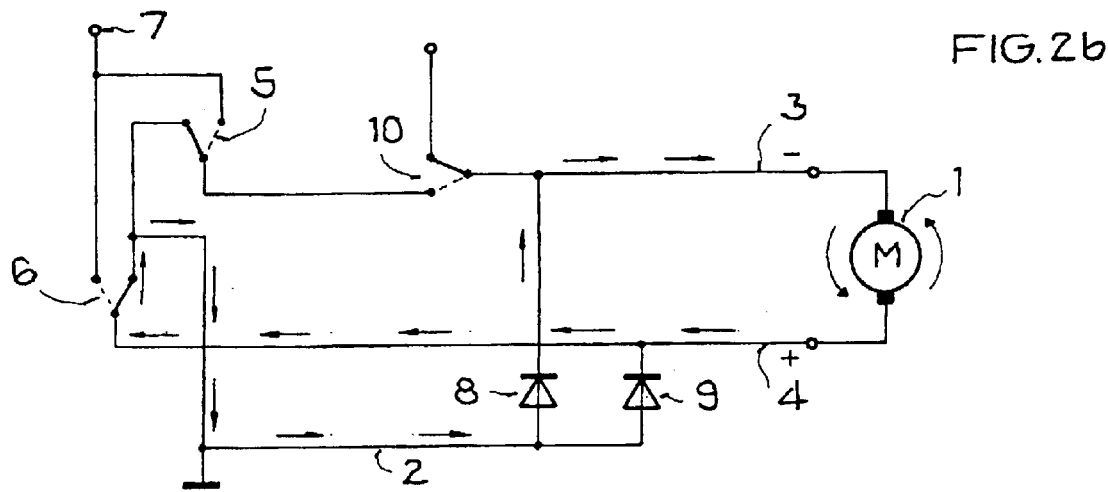

The current flow, which results if applicable in the circuit arrangement with the switch 10 arranged in the first current branch 3, is illustrated in the FIGS. 2a and 2b for both rotational directions of the armature shaft of the electromotor 1 which is not energized with current, whereby the rotational directions are forced by the toothed gear rack. In this context, the position of the switch 10 in the first current branch 3 thereby fixes which one of the two rotational directions of the armature shaft will remain blocked upon the incident action of an external force.

FIG. 2a shows the circuit arrangement for a rotational direction of the armature shaft of the electromotor 1, which, for example, corresponds to the pushing-in or retraction of the belt positioner, and which is illustrated as a rotation in the clockwise direction. In this context, the terminal of the electromotor 1 connected with the first current circuit or loop 3 forms the plus pole, and the terminal of the electromotor 1 connected with the second current branch 4 forms the minus pole. Due to the blocking first diode 8, no conductive connection is formed between the two terminals of the electromotor 1 in the circuit arrangement, so that the toothed gear rack easily lets itself be pushed in without being damped.

FIG. 2b shows the (technical) current flow in the circuit arrangement for the other rotational direction of the armature shaft of electromotor 1, which, for example, corresponds to the driving-out or extension of the belt positioner upon the deceleration of the passenger vehicle, and which is illustrated as a rotation contrary to the clockwise direction. In this context, the terminal of the electromotor 1 connected with the first current branch 3 forms the minus pole, and the terminal of the electromotor 1 connected with the second current branch 4 forms the plus pole. A conductive connection is formed in the circuit arrangement between the two terminals of the electromotor 1 via the second current branch 4, the change-over switch 6, the ground branch 2, the conducting first diode 8, and the first current branch 3, so that upon a rotation of the armature shaft, the toothed gear rack is maximally damped and cannot automatically drive out or extend.

Due to the mirror-symmetrical structural or construction space that is available, and due to the cable guidance, the belt positioner of the driver seat is installed in the passenger vehicle rotated or twisted by 180° relative to the belt positioner of the front passenger seat. Therefore, the rotational direction of the armature shaft, for example by which the belt positioner drives out or is extended, will also reverse. Correspondingly, instead of the first change-over switch 5, the second change-over switch 6 will be connected with the current source by the logic circuit component or chip of the circuit arrangement. Moreover, there exists the necessity, that the other rotational direction of the armature shaft of the electromotor 1 is blocked upon the incident action of an external force.

Figure 3A:
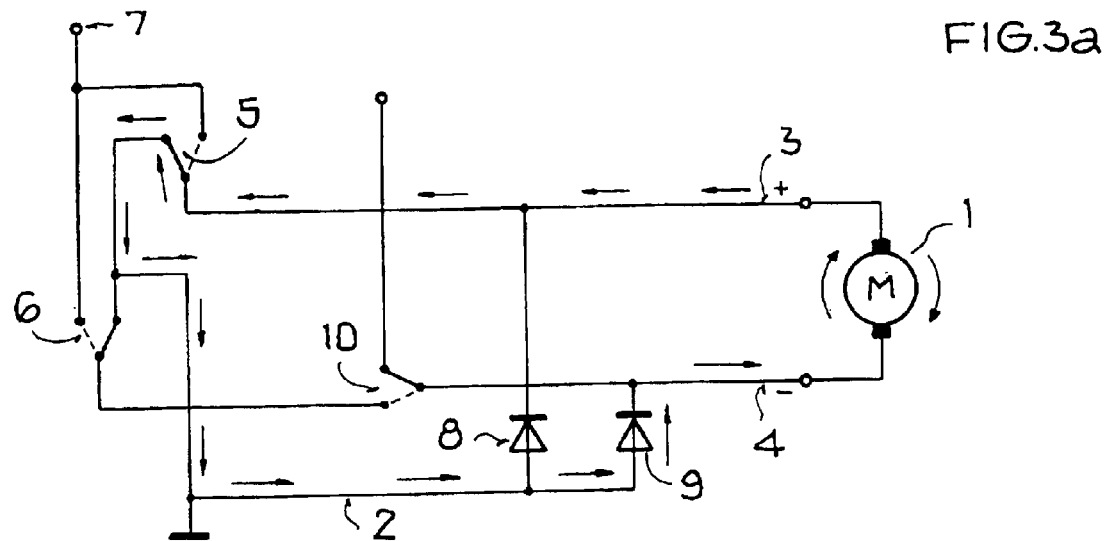
Figure 3B:
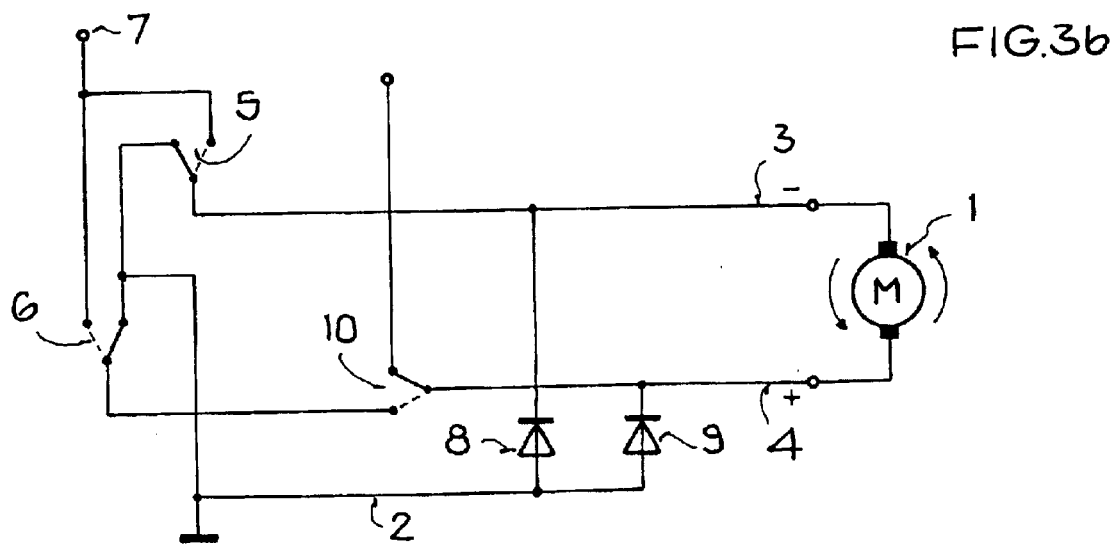

The current flow that results if applicable in the circuit arrangement with the switch 10 arranged in the second current branch 4 is shown in the FIGS. 3a and 3b for both rotational directions of the armature shaft of the electromotor 1 that is not energized with a current, whereby the rotational directions are forced via the toothed gear rack. Now, the position of the switch 10 in the second current branch 4 requires that the rotational direction of the armature shaft other than that illustrated in the FIGS. 2a and 2b is blocked.

FIG. 3a shows the current flow of the circuit arrangement for a rotational direction of the armature shaft of the electromotor 1, which now corresponds to the driving-out or extension of the belt positioner as a consequence of a deceleration of the passenger vehicle, and which is illustrated as a rotation in the clockwise direction. In this context, once again, the terminal of the electromotor 1 connected with the first current circuit or loop 3 forms the plus pole, and the terminal of the electromotor 1 connected with the second current circuit or loop 4 forms the minus pole. A conductive connection is formed in the circuit arrangement between the two terminals of the electromotor 1, via the first current branch 3, the change-over switch 5, the ground branch 2, the conductive second diode 9 and the second current branch 4, so that the toothed gear rack is maximally damped and cannot automatically drive-out or extend.

FIG. 3b shows the circuit arrangement for the other rotational direction of the armature shaft of the electromotor 1, which now corresponds to the driving-in or retraction of the belt positioner, and which is illustrated as a rotation contrary to the clockwise direction. In this context, the terminal of the electromotor 1 connected with the first current circuit or loop 3 forms the minus pole, and the terminal of the electromotor 1 connected with the second current circuit or loop 4 forms the plus pole. Due to the blocking second diode 9, no conductive connection is formed between the two terminals of the electromotor 1 in the circuit arrangement, so that the toothed gear rack allows itself to be easily pushed-in or retracted without being damped.

Through the described circuit arrangement of an electromotor 1 comprising two terminals, exactly one externally forced rotational direction of the armature shaft can be blocked, corresponding to the position of the switch 10, whereby the respective other rotational direction of the armature shaft remains rotatable without being damped. In this context, the circuit arrangement is simply and economically realizable.

What is claimed is:

1. Circuit arrangement of an electromotor (1) comprising two terminals,
    in which one terminal of the electromotor (1) is connected with a first current branch (3) and one terminal of the electromotor (1) is connected with a second current branch (4),
    in which the first and the second current branch (3, 4) respectively comprise a change-over switch (5, 6), through which the first and the second current branch (3, 4) are switched against a current source (7) or against a ground branch (2) corresponding to the desired rotational direction, for operating the electromotor (1),
    and with a first diode (8), which is circuit-connected in the blocking direction between the first current branch (3) and the ground branch (2),
    and a second diode (9), which is circuit-connected in the blocking direction between the second current branch (4) and the ground branch (2),
    and a switch (10), which, depending on the rotational direction of the resting electromotor (1) that is to be blocked,
        either can interrupt the first current branch (3) between the first change-over switch (5) and the connection of the first diode (8) on the first current branch (3), and by which one rotational direction of the electromotor (1) is blocked,
        or can interrupt the second current branch (4) between the second change-over switch (6) and the second diode (9) of the second current branch (4), and by which the other rotational direction of the electromotor (1) is blocked.

2. Circuit arrangement according to claim 1, characterized in that the change-over switches and the switch are formed as relays.

3. A circuit arrangement comprising:
    an electric motor having first and second motor terminals;
    a first diode connected in a forward conduction direction from a ground connection to said first motor terminal;
    a second diode connected in a forward conduction direction from said ground connection to said second motor terminal;
    a first reversal switch connecting said first motor terminal selectively to and switchable between said ground connection and a power connection;
    a second reversal switch connecting said second motor terminal selectively to and switchable between said ground connection and said power connection; and
    a selectively openable and closeable free-rotation blocking switch interposed exclusively either in a first circuit path from said first motor terminal via said first reversal switch to said ground connection or in a second circuit path from said second motor terminal via said second reversal switch to said ground connection.

4. The circuit arrangement according to claim 3, wherein said free-rotation blocking switch is interposed in said first circuit path between said first motor terminal and said first reversal switch, or in said second circuit path between said second motor terminal and said second reversal switch.

* * * * *